United States Patent [19]

Potter

[11] Patent Number: 5,555,172
[45] Date of Patent: Sep. 10, 1996

[54] USER INTERFACE FOR CONTROLLING ACCESSORIES AND ENTERING DATA IN A VEHICLE

[75] Inventor: Suzanne K. Potter, Holland, Mich.

[73] Assignee: Prince Corporation, Holland, Mich.

[21] Appl. No.: 293,487

[22] Filed: Aug. 22, 1994

[51] Int. Cl.$^6$ .............................. G06F 15/00; B60N 3/00; B60R 11/00
[52] U.S. Cl. ..................... 364/424.01; 364/138; 364/146; 340/990; 340/995; 345/25
[58] Field of Search ......................... 364/424.01, 424.02, 364/449, 138, 140, 144, 146, 709.15; 340/990, 995, 815.47, 815.48, 815.49, 825.44, 825.45; 296/153, 97.7, 97.9, 210, 218, 223; 345/7, 9, 23, 173, 254, 902, 905, 25, 119, 167; 455/33.1, 288

[56] References Cited

U.S. PATENT DOCUMENTS

| | | | |
|---|---|---|---|
| Re. 33,417 | 10/1990 | Bhagat et al. | 340/825.44 |
| 4,185,281 | 1/1980 | Silverstone | 340/945 |
| 4,481,508 | 11/1984 | Kamei et al. | 364/709.15 |
| 4,670,747 | 6/1987 | Borras et al. | 340/825.56 |
| 4,731,769 | 3/1988 | Schaefer et al. | 364/424.01 |
| 4,787,040 | 11/1988 | Ames et al. | 364/424.01 |
| 4,797,824 | 1/1989 | Sugiyama et al. | 364/424.05 |
| 4,806,745 | 2/1989 | Oogita | 340/825.31 |
| 4,818,048 | 4/1989 | Moss | 350/3.7 |
| 4,827,520 | 5/1989 | Zeinstra | 381/43 |
| 4,833,614 | 5/1989 | Saitoh et al. | 364/424.05 |
| 4,867,498 | 9/1989 | Delphia et al. | 296/37.7 |
| 4,885,577 | 12/1989 | Nelson | 340/825.44 |
| 4,885,580 | 12/1989 | Noto et al. | 341/23 |
| 4,896,370 | 1/1990 | Kasparian et al. | 340/789 |
| 5,088,070 | 2/1992 | Shiff | 345/156 |
| 5,089,826 | 2/1992 | Yano et al. | 342/457 |
| 5,286,078 | 2/1994 | Mottino et al. | 296/153 |
| 5,323,321 | 6/1994 | Smith, Jr. | 364/449 |
| 5,334,974 | 8/1994 | Simms et al. | 340/995 |

OTHER PUBLICATIONS

Flynn, "Control Panels: From Pushbuttons To Keyboards To Touchscreen", Control Engineering Special Report, vol. 31, No. 6, Jun. 1984, pp. 79–81.

Weber, "Slow And Steady Is The New Strategy In Automotive Electronics", Electronic Special Report, Jun. 17, 1985, pp. 47–52.

Whiteside, "Micros Hit The Road", Datamation, Oct. 1, 1984, pp. 22–26.

Primary Examiner—Kevin J. Teska
Assistant Examiner—Tan Nguyen
Attorney, Agent, or Firm—Price, Heneveld, Cooper, DeWitt & Litton

[57] ABSTRACT

A data entry system includes a display of either icons, alphabet letters, numerals or a combination of visual and alpha-numeric information and allows the user to select data for entry, by using a reversible control to highlight a selected icon or other displayed control or data element and subsequently enter the element with a push-button switch. In a preferred embodiment of the invention, the display is in an overhead console and the information entry controls are located at the forward edge near the top of an armrest console where they are conveniently located and readily available to the operator. In one preferred embodiment a rotary left-right switch is provided to allow the operator to select display information for entry.

27 Claims, 12 Drawing Sheets

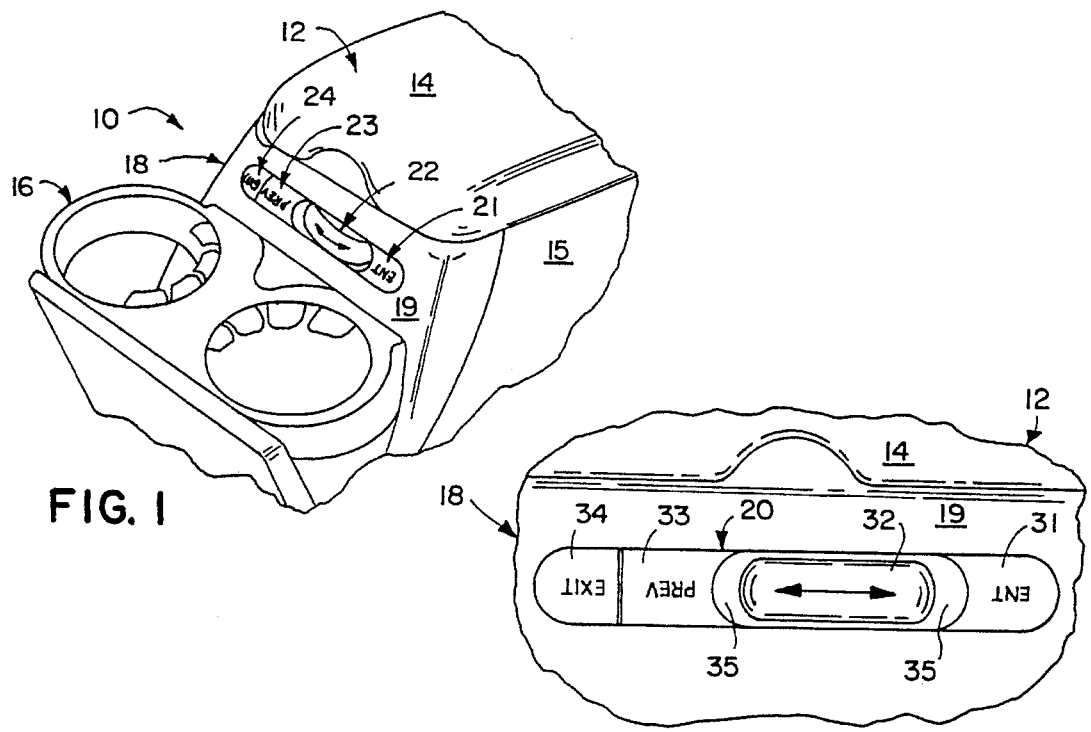

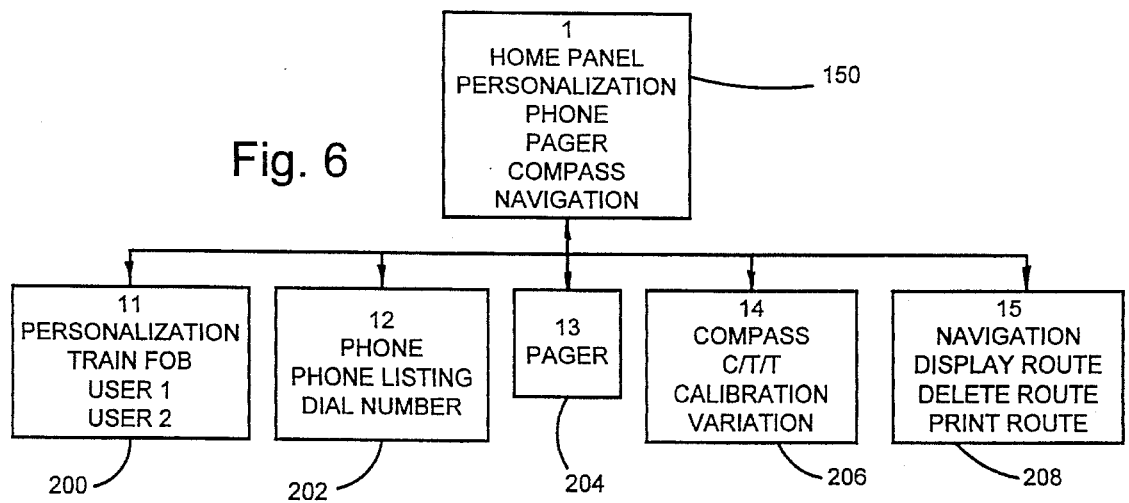
Fig. 6
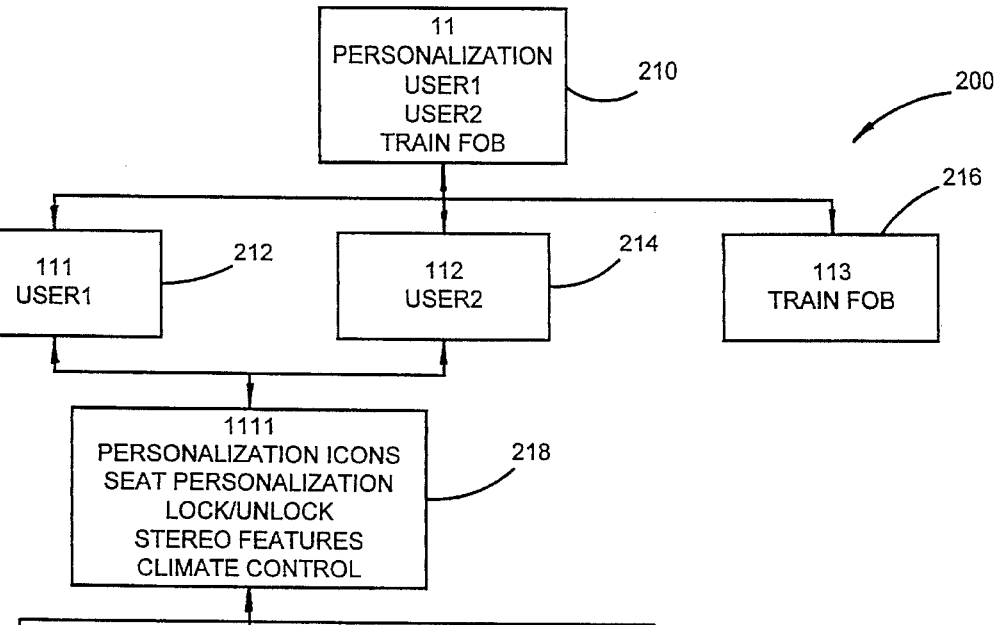
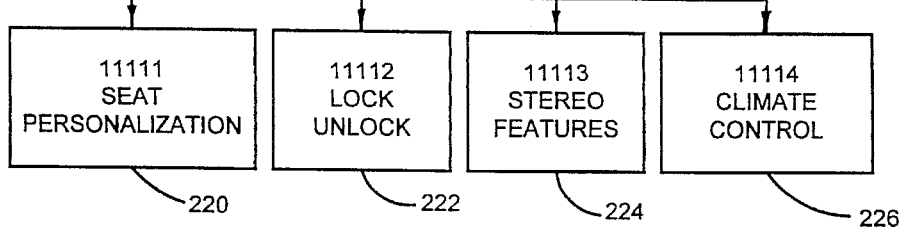
Fig. 7

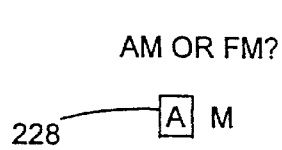
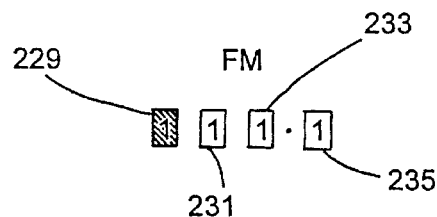
Fig. 8
Fig. 10
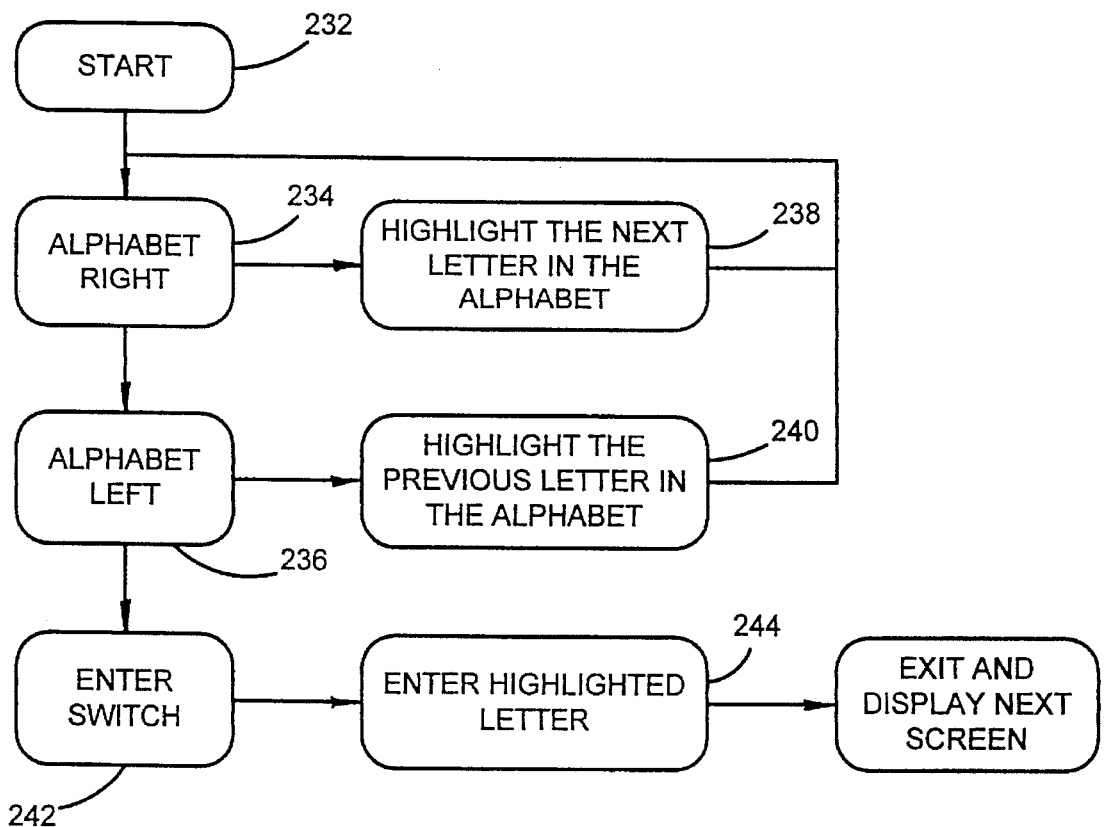
Fig. 9

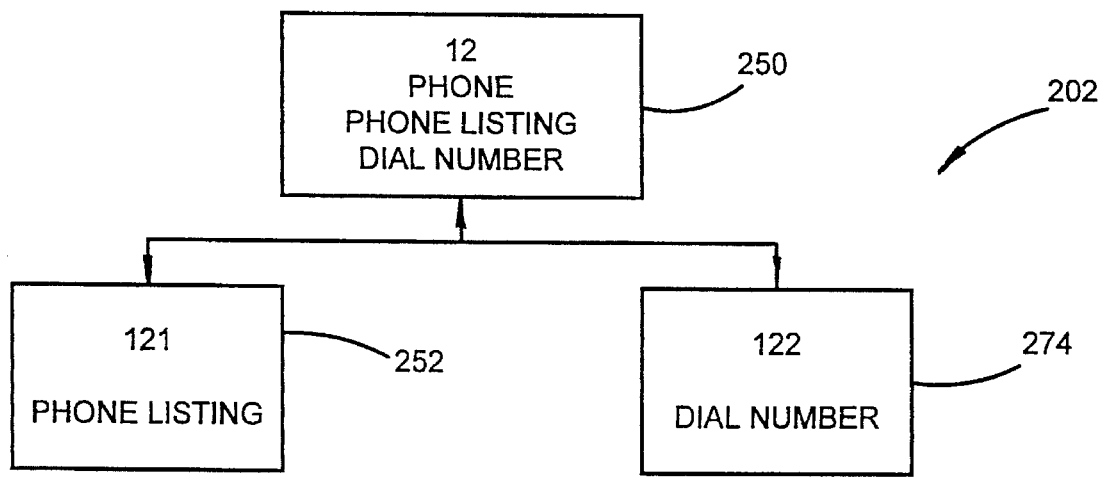
Fig. 11
PHONE LIST
1  JOE SMITH    616-123-4567
2
3
Fig. 12
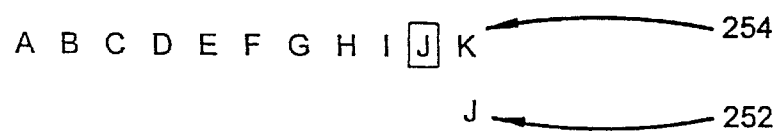
Fig. 13

USER INTERFACE FOR CONTROLLING ACCESSORIES AND ENTERING DATA IN A VEHICLE

BACKGROUND OF THE INVENTION

The present invention relates to vehicle electronics and particularly to a system for entering data and\or control commands to a vehicle electrical circuit.

With the increasing use of microprocessors in vehicles for a variety of vehicle control functions, interaction between the vehicle operator and the microprocessor for programming options and the like is frequently necessary. Although a keyboard can be employed, it requires an excessive amount of space in a vehicle such as an automobile. If a numerical keypad is employed such a data entry system requires the operator to understand for each command to be entered, the corresponding numerical entry number or numbers to carry out the desired command. Further, the use of a keyboard or keypad, particularly if the vehicle in operation is very distracting and could result inattentiveness to driving functions.

A voice actuated control system has been proposed and is represented by U.S. Pat. No. 4,827,520 issued on May 20, 1989 and assigned to the present assignee. Although such a system provides hands-free control of a variety of vehicle options utilizing a microprocessor, it requires training to each one of the vehicle operator's voices and somewhat complicated and expensive electronics at current levels of technology.

SUMMARY OF THE PRESENT INVENTION

The system of the present invention overcomes the difficulty of entering data or vehicle control commands for vehicle programming and operation by providing a visual display of either icons, alphabet letters, numerals or a combination of visual and alpha-numeric information and allows the user, by using a reversible control, to select an icon or other displayed control or data element and subsequently enter the element with a push-button switch. This information entry sequence thus provides a vehicle operator with a display of selectable information, allows the operator to easily select the desired information and subsequently enter such information for carrying out the associated function.

In a preferred embodiment of the invention, the information displayed is provided in an overhead console and the operation information entry controls are located at the forward edge near the top of an armrest console where they are conveniently located and readily available to the operator. In one preferred embodiment a rotary left-right switch is provided to allow the operator to move a cursor or display information in a display window to select a desired command function before entering the command to be executed. In some embodiments of the invention, an array of icons or alpha-numeric displays are simultaneously displayed and the operator moves a cursor to the selected item after which an enter switch is actuated to carry out the command selected. In other embodiments, a window is provided in which different alpha-numeric characters are selectively displayed utilizing the rotary switch. When the desired window shows the command function to be carried out, the enter switch is actuated.

Central to each of the different types of data entry however, is the utilization of a conveniently located control for selecting information which is displayed to the operator without the necessity of utilizing operator manuals or the like thereby providing a user-friendly data and command control entry system for vehicle programming such as personalization of accessories, phone operation, reading of messages received from a paging; system, the selection of compass and trip information or navigational instructions. These and other features, objects and advantages of the present invention will become apparent upon reading the following description thereof together with reference to the accompanying drawings in which;

BRIEF DESCRIPTION OF THE DRAWINGS

FIG. 1 is a fragmentary perspective view of an armrest console embodying the data entry system of the present invention;

FIG. 2 is an enlarged front elevational view of the data entry switches shown in FIG. 1;

FIG. 3 is a fragmentary perspective view of an overhead display incorporated in the system of the present invention;

FIG. 6 is a diagram showing the various displays of the preferred embodiment of the invention;

FIG. 7 is a diagram showing the selectable displays for one of the sub-routines shown in FIG. 6;

FIG. 8 is a diagram of a display for the stereo features sub-routine;

FIG. 9 is a flow diagram of the program sub-routine for controlling the data entry circuit using the display method shown in FIGS. 8 and 10;

FIG. 10 is a diagram of another display for the stereo features sub-routine;

FIG. 11 is a diagram of a display for the phone sub-routine shown in FIG. 6;

FIG. 12 is a diagram of the display for the phone list of the phone sub-routine;

FIG. 13 is a diagram of the display of information for the entry of data using another data entry technique according to the present invention;

DETAILED DESCRIPTION OF THE PREFERRED EMBODIMENT

Figure 4:
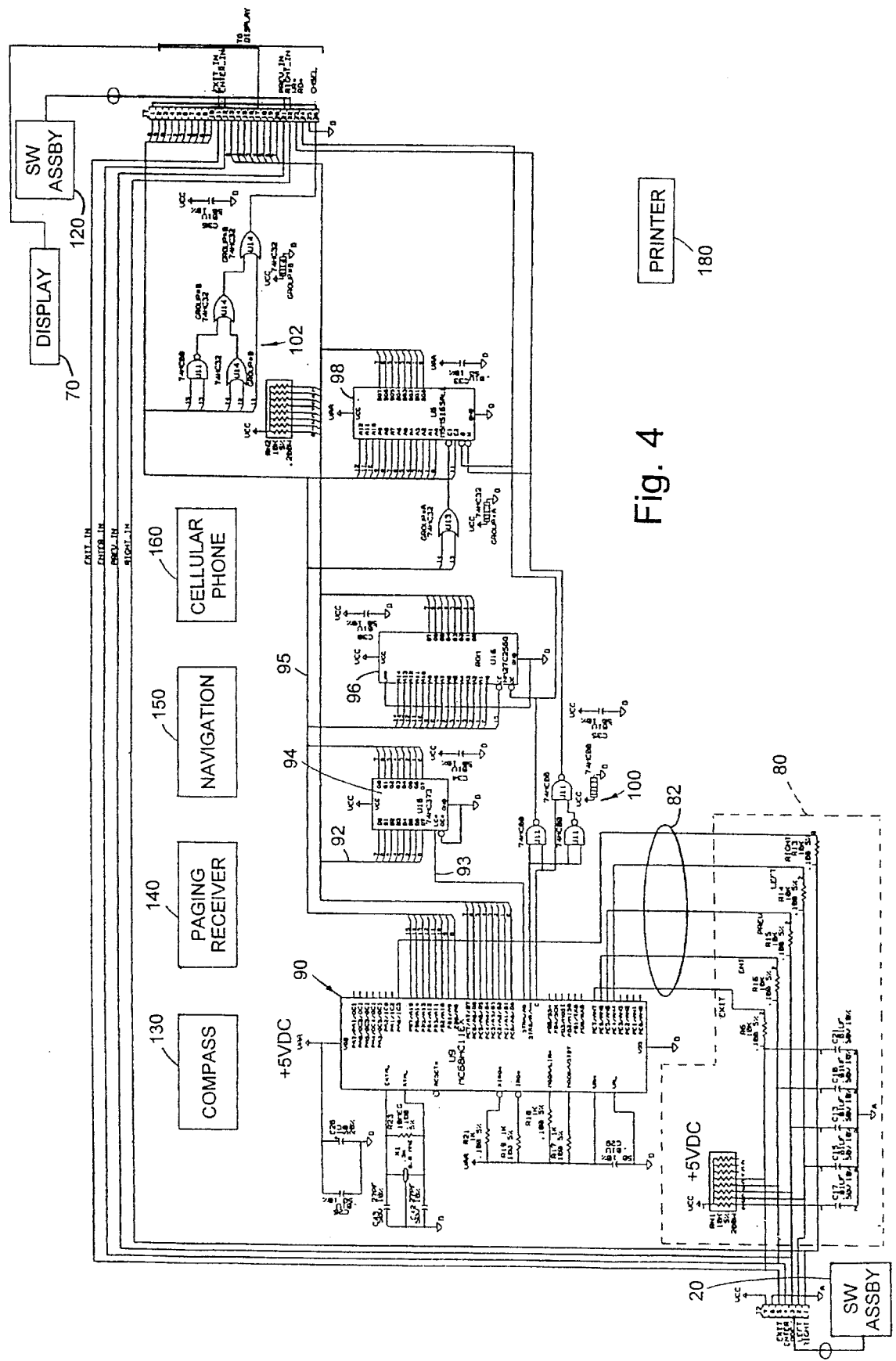
FIG. 4 is an electrical circuit diagram and an overview of the present invention in block and schematic form.

Referring initially to FIGS. 1 and 2 there is shown the interior or a vehicle such as an automobile 10 including a centrally located armrest console 12 having a switch assembly 20 which is conveniently located for use by the operator in selecting information to be displayed and entered in co-operation with the display 70 mounted in an overhead console 50 (FIG. 3). The armrest console includes an upper arm supporting surface which may be in the form of a padded cover 14 pivotally mounted to the walls defining a storage compartment 15 located below cover 14. The armrest console 12 is centrally located between the front seats of the vehicle. The armrest console may also include a collapsible cupholder assembly 16 shown in an extended use position and which slides into and out of the storage compartment 15 for use.

The armrest console integrally includes a forward housing 18 located at the front upper edge of the console 12 and which houses a switch assembly 20 comprising four switches 21, 22, 23 and 24. Housing 18 includes a forwardly and downwardly inclined wall 19 into which the switch assembly 20 is mounted. Each of the switches, which are shown in greater detail in FIG. 5, include exposed switch control surfaces with switch 21 having a push-button 31 with the letters "ENT" for "enter" embossed thereon upside down so it can be read by the vehicle operator looking downwardly on the switch assembly 20 from above. The enter switch provides an enter command for currently displayed data or command information selected by the operator using switch 22. Switch 22 is a rotary switch and includes a rotary knob 32 for controlling the motion of the switch to the left or right as viewed in FIG. 2 which in turn moves a cursor on the display 70 or otherwise changes displayed data or control information to be acted upon by the operator. Switch 23 includes a push-button surface 33 which is embossed by the letters "PREV" standing for "previous screen", the function of which is to control the display to display the previous screen as described in greater detail below. Finally, switch 24 includes a push-button surface 34 with "EXIT" embossed thereon for providing an exit command function for the system. The facing edges of switch contact surfaces 31 and 33 are concavely recessed at 35 as seen in FIG. 2 to provide greater accessibility to the disc shaped control knob 32 for switch 22.

As seen in FIG. 3, the vehicle 10 also includes an overhead console 50 which is mounted to the roof 52 of the vehicle near the front windshield 13 and between the front window visors such as visor 11 which is the passenger side visor as seen in FIG. 3. Console 50 includes a pair of covered storage compartments 54 and 56 with compartment 54 providing sunglass storage and compartment 56 housing, for example, a universal garage door opening transmitter. The console 50 may also include map reading lamps 53 and 55 and provides at its forward end a downwardly inclined bezel 60 housing a display 70 and a four push-button switch assembly 120 which parallels to some extent the switch assembly 20 on the armrest and can be used for the same or similar control functions interchangeably. Thus, a push-button select switch 122 is provided which moves a cursor of the display 70 only to the right as opposed the moving the display left or right as provided by the counter-part rotary switch 22. An "enter" switch 121 corresponds to switch 21 for the entry of a selected command while to the right of the display 70 is a "previous" switch 133 and an "exit" switch 124. The display itself is described in greater detail in connection with FIG. 4 but preferably is a vacuum fluorescent or LCD display capable of providing alpha-numeric display information as well as providing graphic displays such as the icons shown in FIG. 3 or the pager message shown in FIG. 17.

In FIG. 3, for example, there is displayed the "home" screen display which is five icons 61–65 with icon 61 corresponding to personalization, icon 62 corresponding to a telephone control sub-routine, icon 63 corresponding to a page message reading sub-routine, icon 64 corresponding to a compass and odometer display sub-routine, and icon 65 corresponding to a navigation and route information sub-routine. As can be seen in FIG. 3, icon 65 which comprises a pictorial representation of the earth in a rectangular field has the background field illuminated indicating that this icon is currently being highlighted and therefore selected by the operator. Movement of switch 22 by the rotary knob 32 will cause the highlighted icon to change with movement of the switch 22 to the left or right scrolling around to the other end if passing the endmost icon. Switch 122, if actuated, will continually move the icon highlighted to the right and which scrolls around to the left edge after icon 65. Display 70 can provide the display not only of the icons programmed into memory to correspond to sub-routines for computer operation but also alpha-numeric information describing the selected or highlighted icon as for example shown in FIG. 6.

Figure 4A:
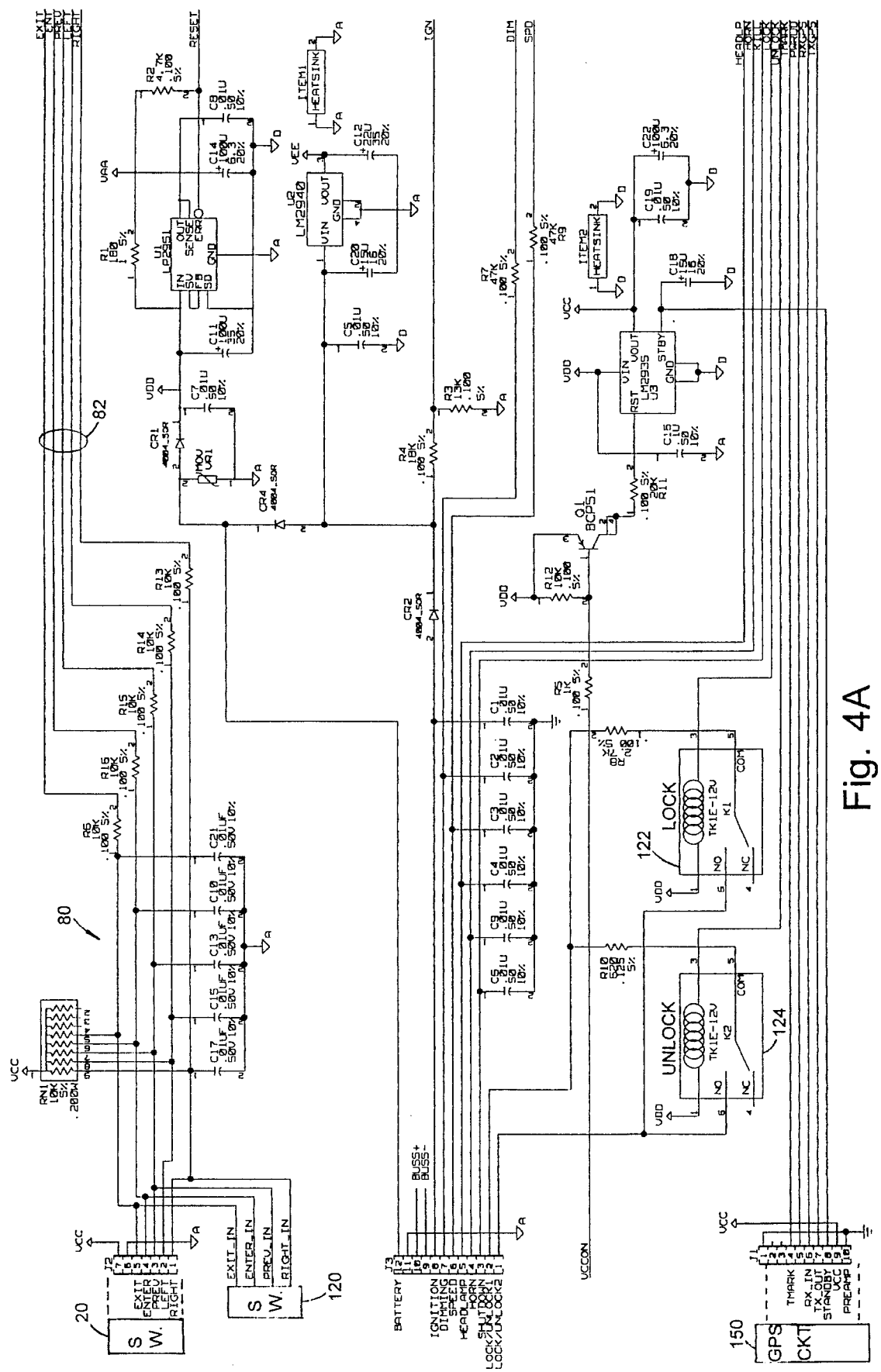
FIGS. 4A–C are electrical circuit diagrams of the present invention in block and schematic form.
Figure 4B:
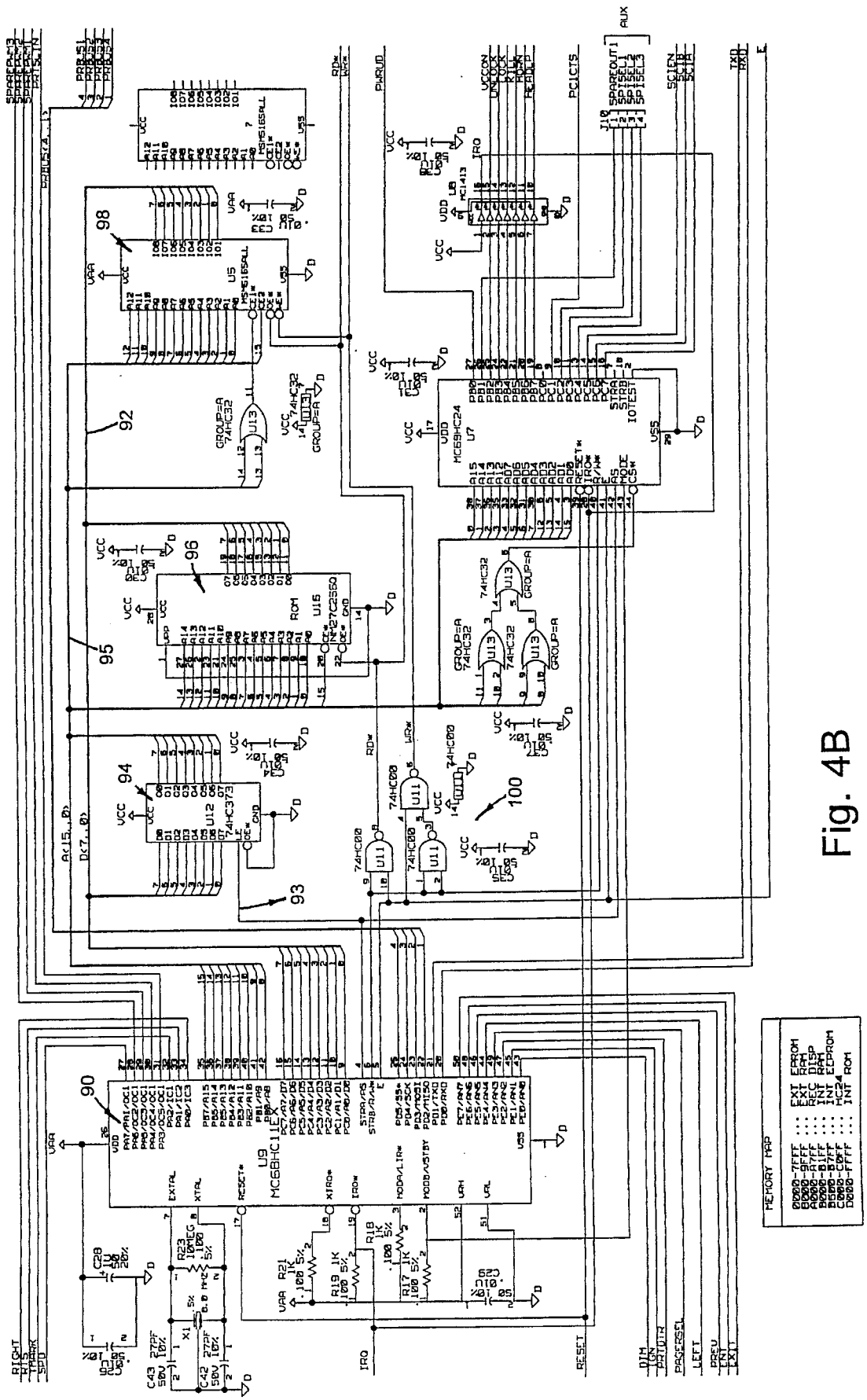
Figure 4C:
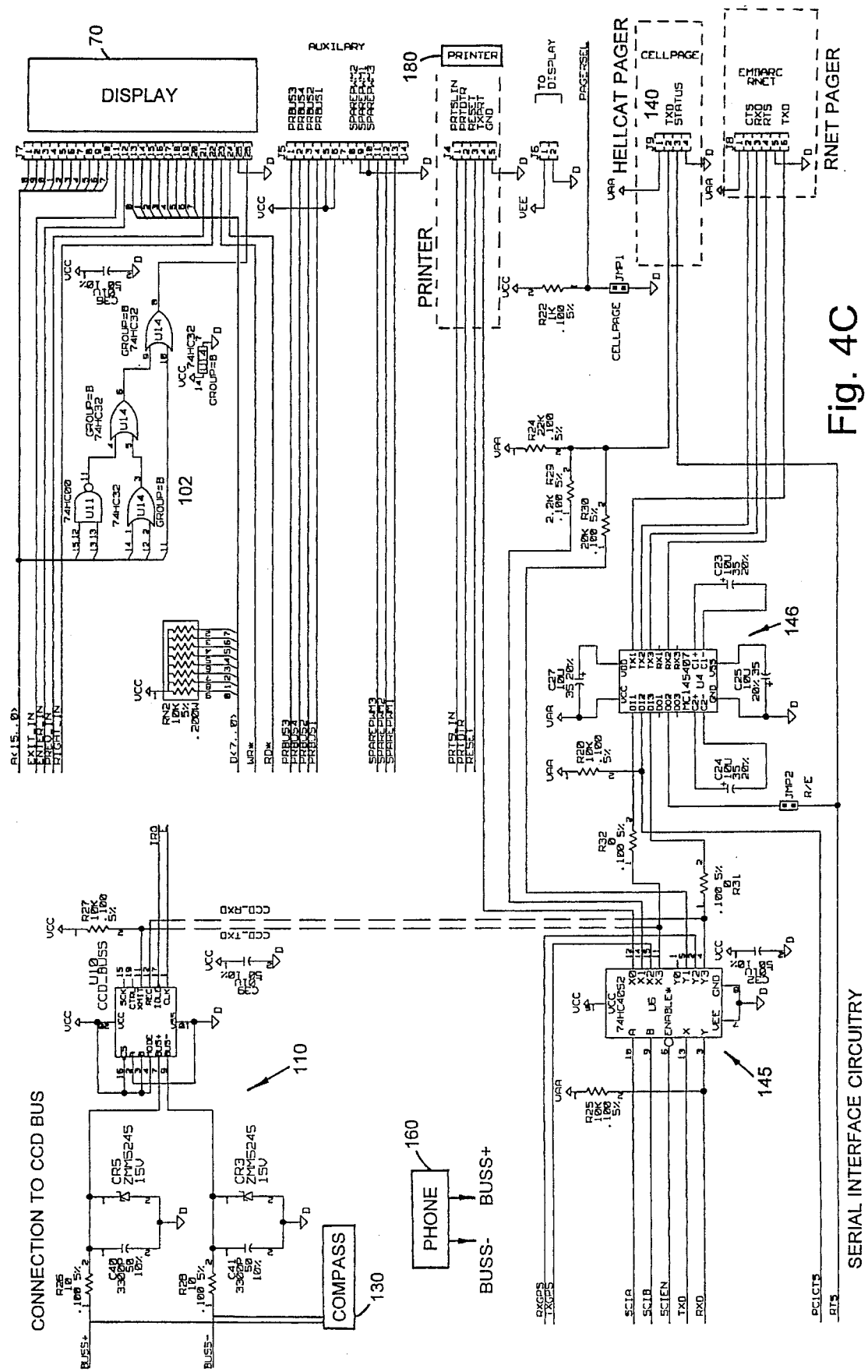
Figure 5:
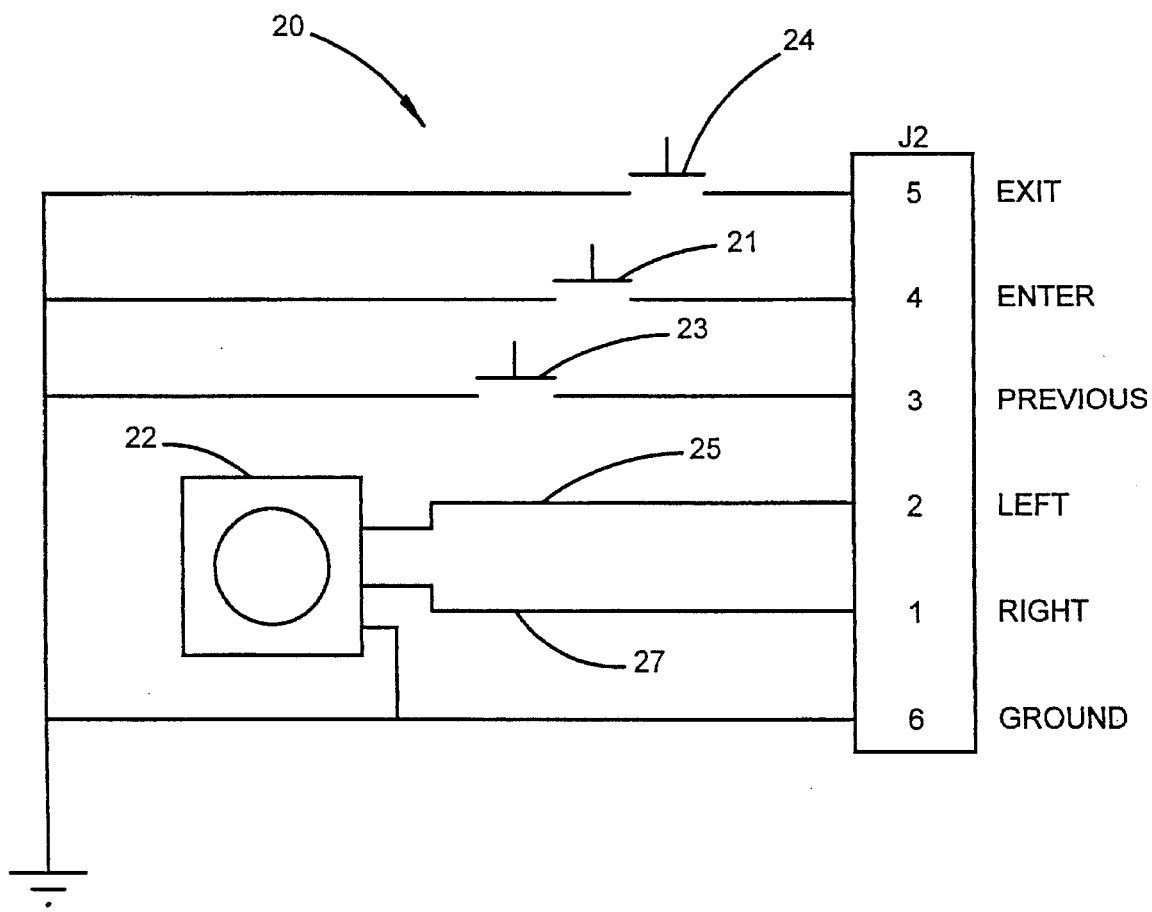
FIG. 5 is a schematic circuit diagram of the data entry switches shown in FIGS. 1 and 2 and in block form in FIG. 4A.

FIGS. 4A–C show in detail the electrical circuit employing the data entry system comprising the switch assembly 20 and display 70 for providing the various control and information functions selected by the vehicle operator. The electrical circuit is shown in block and schematic form with the interconnection of the circuit conductors of the associated FIGURES being conventional as labeled in the FIGURES. The switch assembly 20 is shown in block form with the switches 21–24 shown in detail in FIG. 5. Switch 22 is a rotary switch which provides sequential contact closure signals on conductor 25 (FIG. 5) as the knob 32 is rotated to the left by the operator and sequential contact closure signals on conductor 27 as the knob 32 is rotated to the right. The knob can be continuously rotated to provide as many movement control signals for the cursor associated with display 70 as desired and as described below. Switch 22 can be a commercially available Alps Model No. RK09710H The switch assembly 20 employs six conductors as seen in FIG. 5 for coupling switch assembly 20 to a conditioning circuit 80 which is also coupled to switch assembly 120 (FIG. 4A) comprising the four switches 121–124 in the overhead console 50 (FIG. 3).

Circuit 80 (FIG. 4A) comprises a RC voltage dividing network which has five output conductors represented by output line 82 which are normally held at +VCC which is 5 volt DC in the preferred embodiment of the invention but which upon closure of any one of the switches in switch assemblies 20 or 120 is selectively grounded to identify that switch closure. Circuit 80 thus provides an interface between a momentary switch contact and the inputs to microprocessor 90 to which circuit 80 is coupled as shown.

Microprocessor 90 (FIG. 4B) comprises a Motorola MC68HC11 microprocessor with the five conductors 82 coupled to input ports PA0 and PE4–7. Thus, for example, the exit switch 24 or the corresponding exit switch 124 when momentarily actuated provides a ground signal on port PE7 of the microprocessor which recognizes this command as an "exit" command for the program to return the display to the home panel shown in FIG. 3 regardless of the current selected or displayed information. The microprocessor 90 includes 16 output conductors alternately providing 16-bit addresses and/or data on output conductors A0–A15 and data conductors D0–D7. The 16-bit lines are coupled to a first latch circuit 94 via conductors bundles 92 and 95 and to the strobe A conductor 93 of the microprocessor. The latching circuit 94 comprises a 74HC373 integrated circuit and separates the address information and the time division multiplexed data information from conductors 92.

Coupled to the microprocessor 90 in a conventional manner is a ROM memory 96 and RAM memory 98 also coupled to the microprocessor 90 as shown via conductor bundles 92 and 95. The ROM memory is a NM27C256Q integrated circuit which provides 32 kilobytes of storage for the program for the microprocessor as well as providing data for the various icons and alpha-numeric displayed information. The RAM memory is a MSM5165ALL integrated circuit which provides 8K×8 of memory for changeable data which is entered and erased by the operator as the system is being used. The microprocessor 90 and memory circuits 96 and 98 are also coupled to logic circuits 100 (FIG. 4B) and 102 (FIG. 4C) as shown to conventionally control the application of signal information to display 70 (FIGS. 3 and 4C) for providing the display of information selected by the vehicle operator. The electrical coupling and interrelationship of the microprocessor with the memories and the logic and display circuits is conventional. Display 70, is coupled to jack J7 by a plug and conductors as illustrated by dotted lines in FIG. 4C. The display is a 32×128 pixel vacuum fluorescent display which has sufficient resolution to provide the display icons as shown in FIG. 3 as well as other data such as the page message shown in FIG. 17 and the other various screens as explained in greater detail below.

Figure 17:
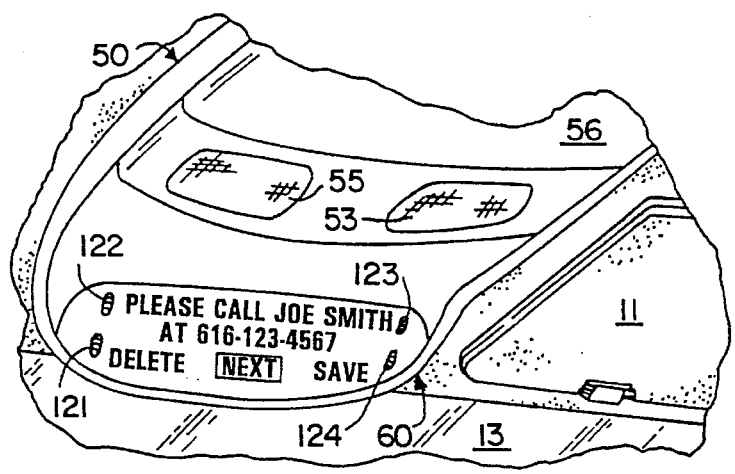
FIG. 17 is a fragmentary perspective view of the overhead console showing an example of a pager message being displayed.
Figure 18:
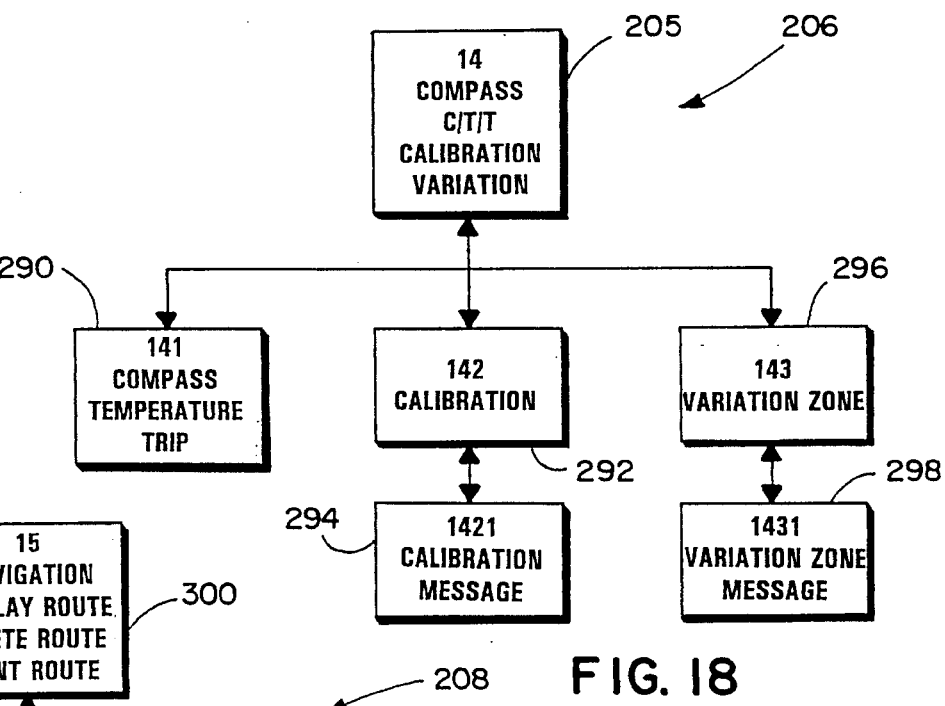
FIG. 18 is a diagram of the displays used for the compass sub-routine.

A compass circuit 130 is coupled to the microprocessor by the vehicle's multiplexer buss circuit 110 as seen in FIG. 4C for providing, when selected, compass heading and other information as shown in FIG. 18. The system also includes a paging receiver 140 (FIG. 4C) coupled to the microprocessor by the analog multiplexer circuit 145 (FIG. 4C) which is coupled to the multiplexer buss 110 and to a 5v to a ±12v converter circuit 46 for RS-232 communication (FIG. 4C). Circuits 145 and 146 provide an interface between vehicle external signals and the vehicle and microprocessor 90 through multiplexer buss 110. Receiver 140 receives paging messages which can be stored for: subsequent reading as seen in connection with FIGS. 16 and 17. A GPS navigation circuit module 150 is also coupled to the microprocessor for providing route information to the operator. A small dot matrix printer 180 is mounted in the console 12 below housing 18 and is coupled to the microprocessor as seen in FIG. 4C for providing the operator with a hard copy of route information by printing stored route instructions. The printer may also be used for other functions and is, in the preferred embodiment, an Epson MD910 with a CBM 909 controller. The microprocessor and data entry switches 20 are also coupled to a cellular phone 160 through multiplexer buss 110 as seen in FIG. 4C to output control signals for the operation of the phone. FIG. 4A shows other vehicle controls such as door lock and unlock relays 125 and 126, respectively, ignition and battery conductors, and other circuit elements not forming a part of this invention.

Turning now to FIG. 5 there is shown the switch assembly 20 which is mounted to the armrest 12 as seen in FIGS. 1 and 2. The switch assembly includes momentary push-button switches 21, 23 and 24 .corresponding to the "ENTER", "PREVIOUS" and "EXIT" commands and the rotary momentary make and break switch 22 which, depending on the direction of :rotation, either provides a momentary left to ground circuit or right to ground circuit to the conditioning circuit 80 and subsequently to the microprocessor 90 via conductors 82. The microprocessor responds to command signals from either switch assembly 20 or 120 to provide the desired information or control functions as now described in conjunction with the display screens and flow diagrams of FIGS. 6–19. The microprocessor provides stored display information written into ROM memory 96 when called upon. The program loops through a the main program checking the closure status of each of the switches of switch assemblies 20 and 120 as well as checking for input data from either the compass circuit 130, paging messages which may be received by the paging receiver 140, or navigational data received through a navigation circuit module 150 coupled to the microprocessor.

The microprocessor is also coupled to a cellular phone 160 as seen in FIG. 4C and upon receipt of operator inputted commands as described in connection with FIG. 11 outputs control signals for the operation of the phone. As one of these data interrupts occur, the appropriate sub-routine is called up for processing and storing the data. A compass circuit which can be employed with microprocessor 90 is disclosed in greater detail in U.S. Pat. No. 4,953,305 issued on Sep. 4, 1990, the disclosure of which is incorporated herein by reference. The paging personalization circuit and paging receiver circuits and their programming are also disclosed in detail in corresponding U.S. patent applications Ser. No. 08/177,710 filed Jan. 5, 1994 entitled Remote Vehicle Programming System and U.S. patent application Ser. No. 08/143,877 filed Oct. 28, 1993 entitled Vehicle Paging Display System, the disclosures of which are incorporated herein by reference.

Initially, the main program displays the home panel which is seen in FIG. 3 as the primary display with the five icons representing personalization, phone, page, compass and navigation. One of the icons will be backlighted or highlighted indicating that is the selected icon which can be controlled by actuation of the "ENTER" switch 21. Rotation of the left/right switch 22 or alternatively depressing switch 122 causes the next adjacent icon on either side to be illuminated for selection upon actuation of the entry button.

Upon selecting one of the desired sub-routines 200, 202, 204, 206 or 208 shown in FIG. 6, the program will move to the sub-routine called for by actuation of the enter switch 21 or its corresponding switch 121 located in the overhead console 50. The sub-routine performs the functions as controlled by the actuation of the switches in the switch assembly 20 with the display 70 providing prompting information to the operator with the use of icons or other alpha-numeric or symbolic displays. If, for example, the operator would like to select the personalization sub-routine from the home panel display 190 (FIG. 6) which as seen in FIG. 3 is currently in the navigation selection position, rotary switch 22 can either be moved to the right to move the selected highlighted icon to the wrap-around position showing the personalization icon or moved to the left through the compass, pager, and telephone to the personalization icon. The enter switch 21 is then actuated to call up the personalization sub-routine 200 (FIG. 6) shown in greater detail FIG. 7.

Turning now to FIG. 7 which shows the display screen and an outline of the programming for the personalization sub-routine 200, upon selection of the personalization icon from the home display 190, the program reads the stored information which is applied to display 90 to display the personalization selections indicated by block 210 in FIG. 7. This display information is stored in ROM memory and switch 22 is rotated to select either user 1, user 2, or the train fob icons which are displayed in display 90 as indicated by panel 210 of FIG. 7. Once the desired highlighted selection is made, the "ENTER" switch 21 is actuated to inform the computer which of the three sub-routines to call up to train for personalization functions. These include in the embodiment shown user 1 sub-routine 212, user 2 sub-routine 214 or training for use of the RF keyless entry fob 216. At this time the display 90 will display the personalization icons identified in block 218 of FIG. 7 which may be, for example, graphic representations similar to that shown in FIG. 3 except displaying, for example for seat personalization, a pictorial representation of a seat, a lock for the door lock unlock personalization function, a radio for the stereo select functions and a thermometer for the climate control functions.

Thus, actuation of the "ENTER" switch 21 when display 90 is displaying the selections shown in block 210 will advance the display to the next displayed screen 218 displaying to either user 1 or user 2, the selections available. The train fob sub-routine 216 shown in FIG. 7 is selected if it is desired to train a keyless entry type RF transmitting key fob such that various codes available by the actuation of switches on the key fob can be programmed to control various vehicle personalization functions. The programming for training the keyless entry fob and the various personalization functions can be done using a variety of conventional programming methods. One programming system for the personalization of the various vehicle options and training of a key fob is disclosed in U.S. Pat. No. 5,278,547 issued Jan. 11, 1994, the disclosure of which is incorporated herein by reference.

At any time during the programming of the vehicle personalization features the programming can be terminated storing the selected features by pressing the "EXIT" switch 24 which returns the program to display the home panel 190 (FIG. 6). The data selections entered prior to such time by the actuation of "ENTER" switch 21 in response to displayed operational choices will have been stored in the computer RAM memory. Decisions which are made can be reversed by pressing the "PREV" switch 23 which allows the operator to return to a display prompted decision and enter the desired choice of data.

In response to the displayed icons, at block 218, the operator, who may either be user 1 or user 2 in the embodiment disclosed, selects one of the four example categories by rotating select switch 22 or pressing its corresponding switch 122 on the overhead console to highlight the selected icon and then presses switch 21 for controlling the computer to move to the sub-routine selected. The sub-routines shown in the preferred embodiment include seat personalization 220, door lock and unlock 222, preset radio control functions (i.e. stereo features) 224, and climate control presets 226. Other personalization options such as rearview mirror, side view mirror controls and the like also can be incorporated in the system of the present invention utilizing conventional programming techniques. If the seat personalization sub-routine 220 is called for, the computer will, upon receiving a command signal from the information corresponding to the highlighting of the seat personalization icon by movement of switch 22 and the entry command signal from the actuation of switch 21, display to the vehicle operator prompting information necessary to preset electrically operated and adjustable vehicle seats where desired.

Thus, display 90 may prompt the operator to manually adjust the seat by actuation of the normal electrical seat control switches to a desired position and once that has been accomplished actuate switch 21 to store the seat position information obtained from the movement of the seat to the desired position in computer memory. When this is accomplished, the entry of the seat position information by the computer will allow the program to move back to the personalization loop looking for new input commands from switch assembly 20 while displaying display screen 218 to allow the operator such as user 1, to select another item for personalization. As will be described herein in greater detail below, the data entry system available through the use of rotary switch 22 and display 90 however provides greater flexibility than merely highlighting an icon for entry and the subsequent entry of data selected.

The utilization of the rotary switch 22 also can be employed for providing specific alpha-numeric messages which can be stored in the computer and subsequently recalled, for example telephone numbers, addresses and the like for use in connection with the cellular phone and navigation systems of the vehicle. As an example of the data entry available with the system of the present invention, for example with the stereo features sub-routine 224 which can be called up from the personalization icon display 218, preset frequencies can be entered into the system utilizing switch assembly 20 or 120 as described in connection with FIGS. 8–10. Referring to FIG. 8 there is shown one display for providing operator prompting information to the vehicle operator for selecting and programming preset frequencies in the vehicle's stereo system. Selection of the stereo features icon from block 218 of FIG. 7 will display a new menu of options to the operator including volume presets, bass and treble controls and other control functions including the frequency band and station presets illustrated in FIGS. 8–10. Preset stereo system receivers are well known and as is the presetting of a variety of frequencies therein, this system however provides for the use of the relatively easily operable rotary switch 22 and display system in connection with the data entry system for presetting AM and FM frequencies.

Referring initially to FIG. 8, there is shown a typical operator prompting display for preset number 1 for receiver programming. The display prompts the operator to select AM or FM bands by providing at least one predetermined location on the display 70 defining a display window 228 which contains initially the letter "A" therein as called from the computer memory look-up table associated with the programming sub-routine for the stereo receiver. As seen in FIG. 9, this sub-routine is started as indicated by block 232 and actuation of rotary switch 22 can move the alphabet characters up the alphabet (to the right) if rotated to the right as indicated by block 234 or down (to the left) as indicated by block 236. Inasmuch as only two choices are required (an "A" or an "F") only these two letters need be available for this sub-routine it being understood that for other sub-routines, the microprocessor memory provides for the scrolling through a selected window the entire alphabet. With "A" being displayed in window 228, if the operator wants to select an FM band preset for position 1, switch 22 is rotated in this case in either direction to display an "F" in window 228. At this time the operator actuates enter switch 21 and the program enters the selected data into memory and responds to the selected "F" to provides the next selected display screen of FIG. 10 for FM frequencies. The program sub-routine for scrolling through the available or necessary letters or number is shown in FIG. 9 where the initial character to be selected is controlled by the operator actuated switch 22.

The program looks for an alphabet right command 234 and when received, the next available letter is highlighted or entered into the window 228. It then moves through the loop again looking for closure of one of the switch contacts for switch 22 in either direction or actuation of the "ENTER" switch 21 storing the highlighted letter or number. Thus the program loops through decisional blocks 234–244 by which the program looks for the movement of rotary switch 22 to move the displayed letter of the alphabet either up or down in the alphabet and entering the selected letter or other character. When the desired letter is being displayed in block 228, "ENTER" switch 21 is actuated as indicated by block 242 and this data is entered into the computer memory corresponding in the example to the first letter of the selected frequency band. In the case of the second letter, since it will always be an "M", "M" will be automatically displayed. Upon entry of the "A" or "F" in window location 228 and the sub-routine will then move to the next sub-routine setting forth the digital information corresponding to the FM frequency selection in a similar fashion prompting blocks of numbers corresponding to four-digits for FM or three-digits for AM are displayed. Thus upon actuation of the "ENTER" switch 21, the highlighted letter is entered into computer memory as indicated by block 244, and the program exits the loop of FIG. 9 and goes to another similar sub-routine for selecting the desired FM frequency and displays the selection screen shown in FIG. 10.

In FIG. 10 four blocks of frequency indicating numbers are displayed and the sub-routine prompts the operator to select an appropriate digit for each location in the display for subsequent entry into the computer in a manner similar to that described in connection with the band selection of FIGS. 8 and 9. Thus, initially window 229 will be highlighted and switch 22 moved left or right to increase or decrease the digit displayed. Upon entry of the data by actuation of switch 21, the next window 231 will be highlighted and the process repeated until data for the four possible frequency selection windows 229, 231, 233, and 235 are selected. The program will provide a test to determine when the last frequencies digit has been entered and when completed increment a counter to initiate programming of preset number 2 by returning to the sub-routine of FIG. 9.

Thus the select and entry system available with the use of rotary switch 22 provides a highlighted display window through which alpha-numeric or other character information can be scrolled by the actuation of switch 22 either by increasing or decreasing numbers displayed in the select block or by going up or down the alphabet for alphabetical information being displayed. Upon actuation of the enter switch, the selected information is entered into the computer memory for use either in controlling the desired operation or, for example, providing message information or, for example also, phone listing information, address information or the like. Any desired alpha-numeric information may thereby be entered into the computer (i.e. the microprocessor memory 98) using the data entry system and the select and enter method described in connection with FIGS. 8–10. As will be described hereinafter, another operator prompting and data entry technique is also available employing the data entry system of the present invention.

As can be appreciated in connection with the entry of preset frequencies as shown in FIGS. 8–10, once the selected frequency has been entered, the last digit entered will inform the computer to move to the next available preset address and once the last address is completed, the display prompt will so indicate to the operator and allow the selection of the other frequency band or ask if any of the presets need to be changed which, again, can be selected by scrolling through a display of a number corresponding to a particular preset or particular display frequency band.

Another of the selectable options from the home panel 190 shown in FIG. 6 is the phone control sub-routine 202. This sub-routine is selected by the highlighting of the phone icon by rotating switch 22 and the actuation of the entry switch 21 or 121. This causes the program to display to the vehicle operator either icons or words as indicated by block 250 of FIG. 11 either showing a list of phone numbers or a phone number to be dialed. Upon selection, for example, the phone listing icon, a sub-routine 252 is called up which provides a pre-programmed listing of stored telephone numbers which can be automatically dialled by the microprocessor cellular telephone interface or which list can be initiated, added to, or deleted utilizing the other data entry technique now described in connection with FIGS. 12–15.

The phone list may take the form of display as shown in FIG. 12 with the first three names and numbers being displayed on three lines of display in display 70. Movement up and down of the display which may include any desired number of entries depending on the available memory, can be selected by rotating switch 22 to the right for scrolling down in the list or to the left scrolling up in the list or wrapping around for example entry 25, the phone list can give the name of the person to be called as well as the calling number. By controlling switch 22 and highlighting number 1 and then pressing "ENTER" the first number on the list can be automatically dialed through the coupling of the microprocessor 90 to the cellular phone 160 in a conventional fashion. Entry of numbers on the list can be achieved by the data entry system shown in FIGS. 13 and 14 which is somewhat similar to the data entry system described in connection with FIGS. 8–10 in terms of ease of operation but utilizes a somewhat different display and data entry technique.

As seen in FIG. 13, display 70 will initially display a series of letters corresponding to adjacent sections of the alphabet. Rotation of switch 22 will move a cursor to highlight a desired letter for entry into the phone list. Thus, rotation switch 22 for example to the letter "J" for the first number on the phone list will cause a cursor to highlight the letter "J" and actuation of switch 21 will enter the letter J into the first position on the phone list which can be, upon entry, displayed below line 252 and on display line 254 shown in FIG. 13. Subsequently, other letters are similarly highlighted and entered to complete the spelling of the name of the person to be called. Rotating switch control knob 32 for switch 22 to the right beyond the letter "K" as shown in FIG. 13 will cause the next successive letter or letters to appear at the right end while the preceding letters are dropped off of the left end of the displayed alphabet sequence. Actuating the "EXIT" switch 24 after the completion of the persons name will cause the display line 252 shown in FIG. 13 to display numbers corresponding to area code and telephone numbers with instead of alphabets being displayed the numbers 0–9 being displayed and selectively highlighted and entered utilizing switches 22 and 21, respectively. In this manner, the operator can relatively easily spell out a persons name and number for addition to the pre-programmed phone list for subsequent auto dialling. The software programming for providing the data entry function for the phone list or other sub-routine is disclosed briefly in the flow diagram of FIG. 14.

Figure 14:
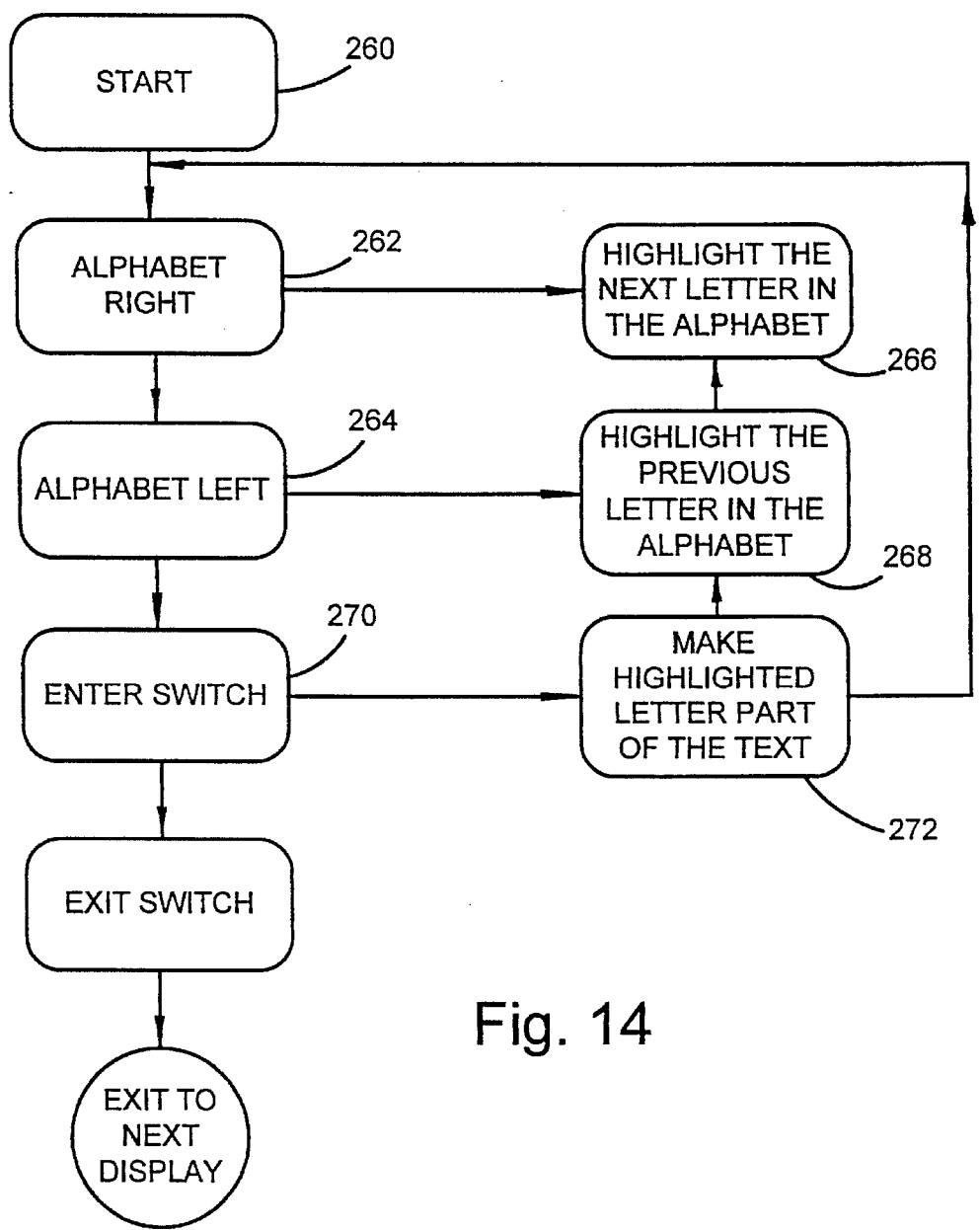
FIG. 14 is a flow diagram for the program sub-routine for data entry using the display format seen in FIG. 13.

Turning now to FIG. 14, the sub-routine starts as indicated by block 260 by displaying the letters "A" through "K" in the order shown in line 252 of FIG. 13. If it is desired to move the alphabet to the right or left, switch 22 is rotated as indicated by block 262 or 264 respectively which causes the highlighting of the next or previous letters as indicated by blocks 266 and 268, respectively. Once the desired letter has been highlighted the "ENTER" switch. 21 is actuated as indicated by block 270 and that data corresponding to that selected letter is entered into the text as indicated by block 272. The process is then repeated until the desired name is completed at which time the "EXIT" switch is actuated causing the program to exit to the next screen display where the number line is displayed for similarly selecting the desired telephone number. Upon completion of the desired number, the program will move to the next entry in the phone list so it can be similarly programmed.

Figure 15:
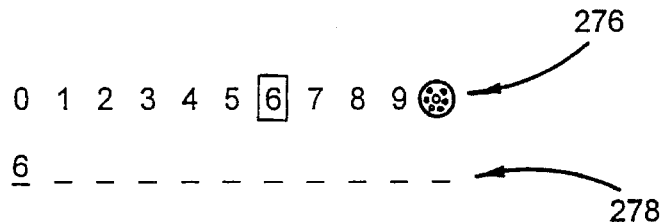
FIG. 15 is a diagram of another display used for the entry of data in the phone dial number sub-routine.

If the operator, however, desires to directly enter a number for dialing without reference to the phone list, the sub-routine shown in FIG. 11 as block 274 if selected allows the direct entry of a number utilizing a similar data entry system as shown in FIG. 15 in which the digits 0–9 are displayed on line 276 and the cursor highlights a selected number, as for example number 6, for entering into the number-to-dial line 278. Once the desired number has been so entered, the "dial" icon can be highlighted and the enter switch actuated to effect dialing of the cellular phone for placing the desired call. The interface circuitry for coupling to the cellular phone is well known and conventional.

Figure 16:
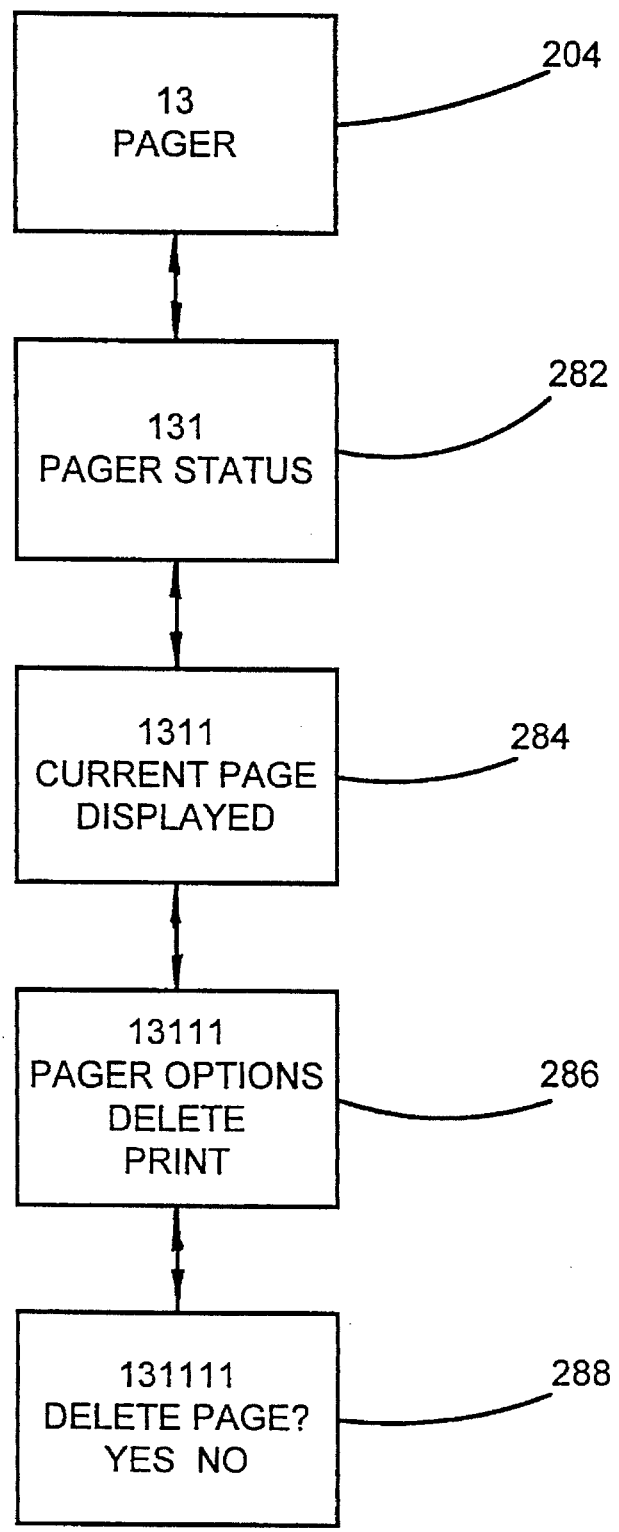
FIG. 16 is a diagram of the displays for the pager sub-routine.

The vehicle may include a paging receiver such as receiver 140 shown in FIG. 4C and if desired, display 70 can be employed for displaying received page messages. Further, the vehicle may include a small dot matrix printer such as printer 180 for providing a hard copy of a page message. If the operator selects the paging sub-routine from the home panel 190 (FIG. 6), the paging sub-routine 204 shown in FIG. 16 is called up. This will cause the display 70 to display an initial current pager message panel 282 which will list a number of page messages received by the paging receiver and highlight whether or not the page message has been received. This can be done, for example, by blinking the paging number corresponding to an unread page message. The switch 22 can be rotated to highlight any one of the received page messages for reading. This is achieved by actuating the "ENTER" button to display the selected page message as indicated by block 284 in FIG. 16. FIG. 17 is an example of a page message which has been received and is being displayed. Rotation of switch control knob 32 and actuating the enter switch provides the microprocessor with data as to which block of the program sequence is to be performed next. As indicated by block 282, unread page messages can be indicated by the blinking of the page message number for such page messages.

Once the page message has been read, upon highlighting the desired icon shown in FIG. 17 and actuation of the "ENTER" switch, the pager option panel 286 allows the operator to delete the page message, which provides a redundant decisional display indicated by block 288 asking the operator a second time whether he or she wishes to actually delete the page. Thus, the page message will not be deleted unless two conscious decisions are made to delete the message. The operator may also opt to have the alpha-numeric message printed by printer 180. Moving the cursor to highlight the icon of display panel 286 for the printer or the word "Print" and actuation of the "ENTER" switch 21 will effect the printing of the message by the printer 180 which can also be installed in the console 12 near the switch assembly 20.

As shown in FIG. 18, the vehicle operator can select the compass sub-routine 206 which allows the selection of compass, temperature and trip display information as indicated by block 290, calibration control as indicated by block 292 which may include prompting calibration messages as indicated by block 294 or variation correction as indicated by block 296 allowing for variation correction of the compass according to a variation zone prompting message 298. The compass selection primary display 205 allows the selection of these various sub-routines.

Figure 19:
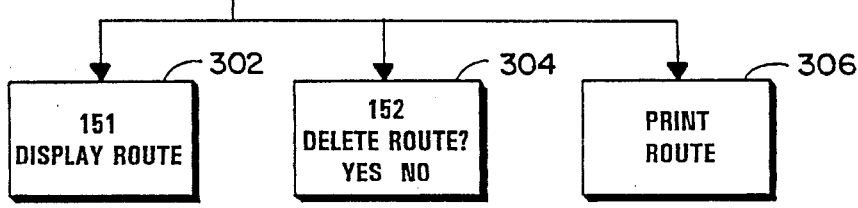
FIG. 19 is a diagram of the displays used for the navigation sub-routine.

Finally, the operator may select the navigation sub-routine 208 shown in FIG. 19 which in its elemental firm may include a route display selection 302, a delete route selection 304 or a print route selection 306. The navigation circuitry 150 may include a suitable memory for storing navigation information and include for example a CD reader with CD stored maps and route information which can be selectively accessed using switch assembly 20 including the rotary switch 22 for controlling the displayed selection according to .either of the two data entry techniques described above, that is providing a window through which either alpha or numeric information can be scrolled for selection or entry or by displaying a sequence of alpha-numeric information and moving the cursor to a selected one for entry to control subsequent information provided on the display or enter commands into the microprocessor for control or storage. The navigation system 150 may also include a GPS receiver so that the vehicle's actual location can be known and routing information to, for example, a selected address :provided by entering the address in one of the manners set forth in FIGS. 8–12 to provide a desired route display as indicated by block 302. If a route has been used and it is desired to delete the route, it can be deleted by selecting the delete route icon of block 300 and actuating the "ENTER" switch 21 for deleting the route which will require two actuations to make certain that the route is not inadvertently deleted. Finally the directions for providing routing information can also be printed by selecting the print icon and actuating the "ENTER" switch to print the sequential directions for the route using printer 180.

The data entry system of the present invention provides a user-friendly structure and method by which data can be selected for entry into a microprocessor for a variety of control and informational purposes. By providing a rotary switch or equivalent control, data can be more easily entered without the need for an alpha-numeric keyboard which would require excessive space in the vehicle for permanent installation and provides relatively easy and understandable operation for those who otherwise may not be familiar data entry systems. It accomplishes this by providing a selectable prompting display and data entry in response to the display to provide control and informational data to and from a microprocessor for use in controlling and programming vehicle options and accessories. It will become apparent to those skilled in the art the various modifications to the preferred embodiments of the invention as described herein can be made without departing from the spirit or scope thereof as defined by the appended claims.

The embodiments of the invention in which an exclusive property or privilege is claimed are defined as follows:

1. A user interface system for controlling a vehicle accessory comprising:

an overhead housing for mounting to the roof of a vehicle;

a display mounted in said overhead housing;

a plurality of vehicle accessories:

a circuit coupled to said vehicle accessories and said display for selectively providing a set of icons for display on said display, a plurality of said display icons each associated with one of said plurality of vehicle accessories; and a data selection control remotely located from said overhead housing within reach of the vehicle operator and coupled to said circuit for selecting a desired one of the set of icons displayed on said display, wherein, upon selection of a desired one of the icons, said circuit provides a set of display symbols to said display for display thereon, said set of display symbols corresponding to control operations for the vehicle accessory associated with the selected one of the set of display icons.

2. The system as defined in claim 1, wherein said plurality of vehicle accessories include any combination of three or more of a compass, a paging receiver, a cellular telephone, a printer, and a navigation information circuit.

3. The system as defined in claim 1, wherein said data selection control includes a rotary switch.

4. The system as defined in claim 1, and further including an armrest console for mounting in a vehicle and wherein said data selection control is mounted to a forward upper edge of said armrest console.

5. The system as defined in claim 4, wherein said data selection control includes a rotary switch.

6. The system as defined in claim 5, wherein said overhead housing is an overhead console for mounting to the roof of a vehicle.

7. The system as defined in claim 1, wherein said overhead housing is an overhead console for mounting to the roof of a vehicle.

8. A user interface system for controlling a vehicle accessory comprising:

a housing;

a display mounted in said housing;

a plurality of vehicle accessories including a cellular telephone;

a circuit coupled to said vehicle accessories and said display for selectively providing a set of icons for display on said display, a plurality of said display icons each associated with one of said plurality of vehicle accessories; and a data selection control coupled to said circuit for selecting a desired one of the set of icons displayed on said display, wherein, upon selection of a desired one of the icons, said circuit provides a set of display symbols to said display for display thereon, said set of display symbols corresponding to control operations for the vehicle accessory associated with the selected one of the set of display icons, said set of icons includes an icon associated with said cellular telephone, and said set of display symbols includes a string of alpha-numeric characters, upon selection of the icon associated with said cellular telephone, said circuit generates and displays on said display the string of sequential alpha-numeric characters and a movable cursor for aligning with any of said alpha-numeric characters, and said data selection control moves said cursor to align said cursor with any of said alpha-numeric characters for selecting the alpha-numeric character corresponding to the cursor location and storing data representative of the selected alpha-numeric character.

9. The system as defined in claim 8, wherein said set of display symbols further includes a dial icon, upon selection of said dial icon, said cellular telephone dials a telephone number displayed on said display.

10. A user interface system for controlling a vehicle accessory comprising:

a housing;

a display mounted in said housing;

a plurality of vehicle accessories including a paging receiver;

a circuit coupled to said vehicle accessories and said display for selectively providing a set of icons for display on said display, a plurality of said display icons each associated with one of said plurality of vehicle accessories; and a data selection control coupled to said circuit for selecting a desired one of the set of icons displayed on said display, wherein:

upon selection of a desired one of the icons, said circuit provides a set of display symbols to said display for display thereon, said set of display symbols corresponding to control operations for the vehicle accessory associated with the selected one of the set of display icons;

said set of icons includes an icon associated with said paging receiver, and said set of display symbols includes a received paging message and a plurality of command words each having a control operation associated therewith;

upon selection of the icon associated with said paging receiver, said circuit generates and displays on said display the received paging message, the plurality of command words, and a movable cursor for aligning with any of said command words;

said data selection control moves said cursor to align said cursor with any of said command words for selecting the command word corresponding to the cursor location;

said circuit generating and providing a control signal corresponding to the selected command word to said paging receiver; and said paging receiver performs the control operation associated with the selected command word in response to the control signal.

11. The system as defined in claim 10, wherein said command words include a delete command for deleting the received message, a save command for saving the received message, and a next command for requesting that the next received message be displayed on said display.

12. A user interface system for controlling a vehicle accessory comprising:

a housing;

a display mounted in said housing;

a plurality of vehicle accessories;

a circuit coupled to said vehicle accessories and said display for selectively providing a set of icons for display on said display, a plurality of said display icons each associated with one of said plurality of vehicle accessories; and a data selection control coupled to said circuit for selecting a desired one of the set of icons displayed on said display, wherein:

upon selection of a desired one of the icons, said circuit provides a set of display symbols to said display for display thereon, said set of display symbols corresponding to control operations for the vehicle accessory associated with the selected one of the set of display icons;

said set of icons includes a display icon associated with vehicle accessory personalization, said set of display symbols includes a second set of icons each associated with one of said plurality of vehicle accessories;

upon selection of an icon of said second set of icons, said circuit generates and displays on said display a second set of display symbols, each associated with control operations for controlling the manner of operation of the vehicle accessory associated with the selected one of the second set of icons, and a movable cursor for aligning with any of said display symbols of said second set;

said data selection control moves said cursor to align said cursor with any of said display symbols of said second set for selecting the display symbol of said second set corresponding to the cursor location;

said circuit generating and providing a control signal corresponding to the selected display symbol of said second set; and said vehicle accessory corresponding to the selected icon of said second set performs the control operation associated with the selected display symbol of said second set in response to the control signal.

13. A user interface system for controlling a vehicle accessory comprising:

an overhead housing for mounting to the roof of a vehicle;

a display mounted in said overhead housing;

an armrest console for mounting in the vehicle;

a circuit coupled to said display for selectively providing display symbols for display on said display, each display symbol associated with a control operation for a vehicle accessory;

a data selection control mounted in said armrest console and coupled to said circuit for selecting a desired display symbol displayed on said display;

a data entry switch coupled to said circuit for generating a control signal corresponding to the selected display symbol; and a vehicle accessory having an electrical control circuit coupled to said circuit and responsive to said control signal for controlling said vehicle accessory in accordance with the control operation associated with the selected display symbol.

14. The system as defined in claim 13, wherein said data selection control includes a rotary switch.

15. The system as defined in claim 13, wherein said circuit includes a microprocessor.

16. The system as defined in claim 13, wherein said plurality of vehicle accessories include any combination of three or more of a compass, a paging receiver, a cellular telephone, a printer, and a navigation information circuit.

17. A data entry system for a vehicle comprising:

an overhead housing;

a display mounted in said overhead housing;

an armrest console for mounting in a vehicle;

a circuit coupled to said display for generating and displaying on said display, a string of sequential alpha-numeric characters and a movable cursor for aligning with any of said alpha-numeric characters;

a cursor control mounted in said armrest console and coupled to said circuit for moving said cursor to align the cursor with any of said alpha-numeric characters; and an entry switch coupled to said circuit for selecting the alpha-numeric character corresponding to the cursor location and storing data representative of the selected alpha-numeric character.

18. The system as defined in claim 17, wherein said cursor control includes a rotary switch.

19. The system as defined in claim 17 wherein said cursor control is mounted to an upper forward edge of said armrest console.

20. The system as defined in claim 17, wherein said overhead housing is an overhead console for mounting to the roof of a vehicle.

21. A data entry system for a vehicle comprising:

an overhead housing for mounting to a roof of a vehicle, said overhead housing including a display, said display having a predetermined area defining an active window for displaying a single operator selectable alpha-numeric character therein;

an electrical circuit coupled to said display for generating alpha-numeric characters to be selectively individually displayed in said active window;

an armrest console for mounting in a vehicle;

a data select switch mounted in said armrest console and coupled to said circuit for sequentially selecting alpha-numeric characters for display in said active window;

an enter switch coupled to said electrical circuit for providing an enter command when actuated by a user in response to the display in said active window of a desired alphanumeric character; and a memory coupled to said electrical circuit for storing data representing the desired alpha-numeric character in response to said enter command.

22. The system as defined in claim 21, wherein said data select switch comprises a rotary switch providing left and right switch closure signals.

23. The system as defined in claim 21 wherein said data select switch is mounted to a forward edge of said armrest console.

24. The system as defined in claim 21, wherein said overhead housing is an overhead console for mounting to the roof of a vehicle.

25. A data entry system for a vehicle comprising:

an overhead housing for mounting to a roof of a vehicle, said overhead housing including a display for displaying information;

a circuit including a microprocessor coupled to said display for generating alpha-numeric characters for selective display by said display;

an armrest console for mounting in the vehicle;

a data select control mounted on said armrest console and coupled to said circuit for selecting alpha-numeric characters displayed on said display;

an enter switch coupled to said circuit for providing a signal in response to the selection of a desired alpha-numeric character by said data select control and actuation of said enter switch; and a memory circuit coupled to said circuit and responsive to said signal for storing data representing the selected alpha-numeric characters.

26. The system as defined in claim 25, wherein said circuit provides the display of a string of alpha-numeric characters and a movable cursor for aligning with any of said alpha-numeric characters; and wherein said data select control moves said cursor to align said cursor with any of the string of alpha-numeric characters.

27. The system as defined in claim 25, wherein said display has a predetermined area defining an active window for displaying a single operator selectable alpha-numeric character therein; and wherein said data select control sequentially selects alpha-numeric characters for display in said window.

* * * * *

UNITED STATES PATENT AND TRADEMARK OFFICE
CERTIFICATE OF CORRECTION

PATENT NO. : 5,555,172
DATED : September 10, 1996
INVENTOR(S) : Suzanne K. Potter It is certified that error appears in the above-indentified patent and that said Letters Patent is hereby corrected as shown below:

Column 1, line 22
After "vehicle" insert --is--;

Column 1, line 22
After "operation" insert --,--;

Column 1, line 23
After "result" insert --in--;

Column 2, line 8
After "paging" delete --;--;

Column 3, line 57
"the moving" should be --to moving--;

Column 3, line 61
"133" should be --123--;
Column 3, line 62
After "detail" insert --below--;

Column 5, line 20
After "70" delete ",";

Column 5, line 38
Delete ":";

Column 5, line 58
Delete ".";

UNITED STATES PATENT AND TRADEMARK OFFICE
CERTIFICATE OF CORRECTION

PATENT NO. : 5,555,172
DATED : September 10, 1996
INVENTOR(S) : Suzanne K. Potter It is certified that error appears in the above-indentified patent and that said Letters Patent is hereby corrected as shown below:

Column 5, line 61
Delete ":";

Column 6, line 3
Delete "a";

Column 6, line 46
After "(FIG. 6)" insert --,--;

Column 6, line 53
After "detail" insert --in--;

Column 8, line 51
"enter" should be --"ENTER"--;

Column 8, line 53
"provides" should be --provide--;

Column 10, line 64
Delete ".";

Column 11, line 14
"enter" should be --"ENTER"--;

Column 11, line 38
"enter" should be --"ENTER"--;

Column 12, line 10
Delete ".";

Column 12, line 19
Delete ":";

UNITED STATES PATENT AND TRADEMARK OFFICE
CERTIFICATE OF CORRECTION

Page 3 of 3

PATENT NO. : 5,555,172
DATED : September 10, 1996
INVENTOR(S) : Suzanne K. Potter It is certified that error appears in the above-indentified patent and that said Letters Patent is hereby corrected as shown below:

Column 12, line 39
After "familiar" insert --with--;

Column 12, line 45
"the various" should be --that various--; and

Column 12, line 56
":" should be --;--.

Signed and Sealed this

Third Day of December, 1996

Attest:

BRUCE LEHMAN

*Attesting Officer*      *Commissioner of Patents and Trademarks*